United States Patent
Kim

(10) Patent No.: US 11,219,877 B2
(45) Date of Patent: Jan. 11, 2022

(54) REACTOR FOR A METALLOCENE CATALYST-BASED SOLUTION POLYMERIZATION PROCESS FOR PREPARING POLYOLEFIN POLYMERS

(71) Applicant: C&CPEL CO., LTD., Daejeon (KR)

(72) Inventor: Yangkee Kim, Daejeon (KR)

(73) Assignee: C&CPEL CO., LTD., Daejeon (KR)

( * ) Notice: Subject to any disclaimer, the term of this patent is extended or adjusted under 35 U.S.C. 154(b) by 710 days.

(21) Appl. No.: 16/095,971

(22) PCT Filed: Jul. 7, 2017

(86) PCT No.: PCT/KR2017/007317
§ 371 (c)(1),
(2) Date: Oct. 24, 2018

(87) PCT Pub. No.: WO2018/009034
PCT Pub. Date: Jan. 11, 2018

(65) Prior Publication Data
US 2021/0220794 A1  Jul. 22, 2021

(30) Foreign Application Priority Data
Jul. 8, 2016  (KR) .................. 10-2016-0086856

(51) Int. Cl.
*B01J 19/24* (2006.01)
*C08F 2/01* (2006.01)
(Continued)

(52) U.S. Cl.
CPC ........... *B01J 19/246* (2013.01); *B01J 19/006* (2013.01); *B01J 19/244* (2013.01); *B01J 19/245* (2013.01);
(Continued)

(58) Field of Classification Search
CPC .. B01J 19/246; B01J 19/2435; B01J 19/2465; B01J 19/006; B01J 2219/00103;
(Continued)

(56) References Cited

U.S. PATENT DOCUMENTS 5,817,902 A   10/1998  Xie et al.
8,841,389 B2   9/2014  Kutschera et al.

FOREIGN PATENT DOCUMENTS

EP    2151416 A1     2/2010
JP    2012526895 A  11/2012

OTHER PUBLICATIONS

International Search Report of PCT/KR2017/007317, dated Dec. 12, 2017, English translation.
(Continued)

*Primary Examiner* — Lessanework Seifu
(74) *Attorney, Agent, or Firm* — STIP Law Group, LLC

(57) ABSTRACT

Disclosed is a reactor for solution polymerization process using a metallocene catalyst for preparing polyolefin. The reactor includes: a reaction vessel for mixing a hydrocarbon-based solvent and an olefin monomer to produce polyolefin; a feed inlet installed at a lower portion of the reaction vessel to feed a feed including an unreacted monomer, a solvent, and a catalyst into the reaction vessel; a guide pipe having a cylinder shape being open at respective ends, installed along a central axis of the reaction vessel, and dividing an internal space of the reaction vessel into an up-flow region where a reaction mixture flows upward and a down-flow region where the reaction mixture flows downward; a swirling flow-inducing blade attached to the exterior surface of the guide pipe, causing the reaction mixture in the reaction vessel to rise along the exterior surface of the guide pipe while forming a swirling flow.

6 Claims, 2 Drawing Sheets

(51) Int. Cl.
*B01J 19/00* (2006.01)
*C08F 2/06* (2006.01)

(52) U.S. Cl.
CPC ....... *B01J 19/2435* (2013.01); *B01J 19/2445* (2013.01); *B01J 19/2465* (2013.01); *C08F 2/01* (2013.01); *C08F 2/06* (2013.01); *B01J 2204/007* (2013.01); *B01J 2219/00103* (2013.01); *B01J 2219/00105* (2013.01); *B01J 2219/00164* (2013.01); *B01J 2219/00168* (2013.01); *B01J 2219/00772* (2013.01); *B01J 2219/00779* (2013.01); *B01J 2219/185* (2013.01); *C08L 2205/025* (2013.01); *C08L 2314/06* (2013.01)

(58) Field of Classification Search
CPC ...... B01J 2219/00105; B01J 2219/0011; B01J 2219/00114; B01J 2219/00164; B01J 2219/00763; B01J 2219/0077; B01J 2219/00779; C08F 2/01
See application file for complete search history.

(56) References Cited

OTHER PUBLICATIONS

The extended European Search Report of 17 79 0661, dated Jan. 3, 2020.

[FIG. 1]
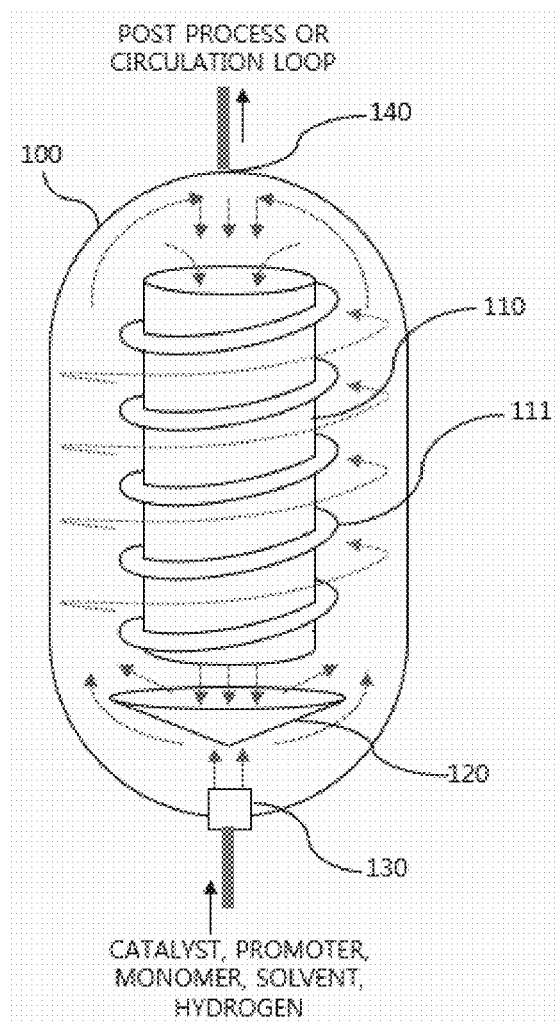

[FIG. 2]
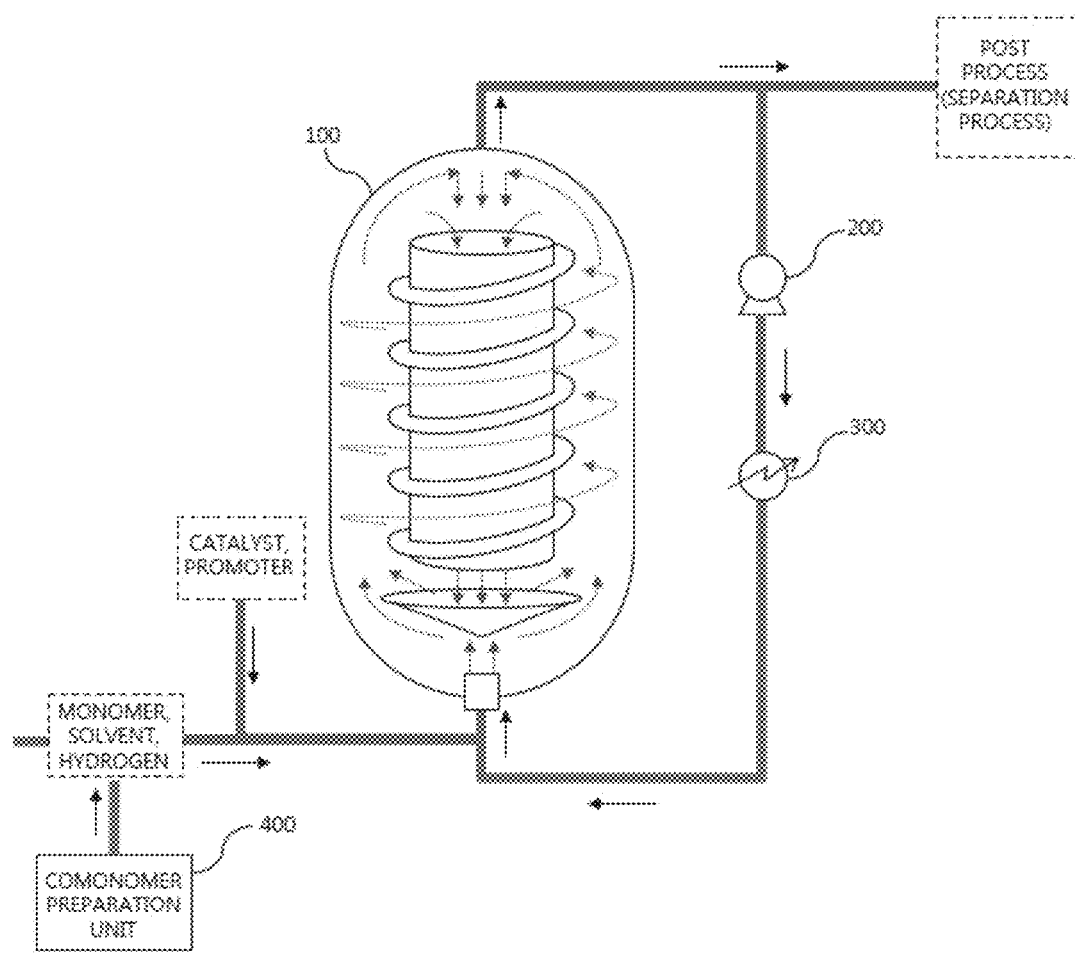

REACTOR FOR A METALLOCENE CATALYST-BASED SOLUTION POLYMERIZATION PROCESS FOR PREPARING POLYOLEFIN POLYMERS

CROSS-REFERENCE TO RELATED APPLICATIONS

This application is the U.S. National Phase under 35 U.S.C. § 371 of International Application No. PCT/KR2017/007317 filed on Jul. 7, 2017, which in turn claims the benefit of Korean Application No. 10-2016-0086856, filed on Jul. 8, 2016, the disclosures of which are incorporated by reference into the present application.

TECHNICAL FIELD

The present invention relates to a reactor for a metallocene catalyst-based solution polymerization process for preparing polyolefin polymers. More particularly, the present invention relates to a reactor for preparing polyolefin polymers using a metallocene catalyst, the reactor minimizing a local temperature variation in an internal space thereof by improving flowability of reactants in the internal space, thereby minimizing a variation in reaction rate relying on temperature and consequently preparing polymers with homogeneous physical properties.

BACKGROUND ART

A metallocene catalyst-based solution polymerization process for preparing polyolefin polymers, which belongs to the technical field of the present invention, is a process of preparing a homopolymer by using a metallocene catalyst and a mixture consisting of a solvent and at least one monomer selected from alpha olefins including ethylene, propylene, butane, hexane, and octane. For reference, the term "metallocene catalyst" refers to an organometallic compound in which ligand derivatives and transition metals are diversely combined wherein the ligand derivatives have a cyclopentadien ($C_5H_5$) basic structure specified in various literature or patent documents or a structure of various chemical structures extended from the cyclopentadien ($C_5H_5$) basic structure, and the transition metals include Ti, Zr, Hf, V, Nb, Ta, Cr, Mb, and W.

A typical metallocene catalyst-based solution polymerization process for preparing polyolefin polymers is a process mixing and reacting a monomer, a solvent, and a metallocene catalyst in a polymerization reactor, and then thickening and solidifying the resultant reaction product.

The solution polymerization process consumes a monomer during polymerization, and a polymer produced by polymerizing the monomers is dissolved in a solvent. As the concentration of the polymer increases, i.e. as the polymerization reaction progresses, the viscosity of a reaction mixture consisting of the polymer, the unreacted monomer, and the solvent increases.

When the viscosity of the reaction mixture in the reactor increases, flowability of the reaction mixture is deteriorated and thus it becomes difficult to prepare a polymer having homogeneous physical properties. More specifically, as the flowability the reaction mixture decreases, a local temperature variation in the reactor increases. Consequently, it is difficult to expect a uniform reaction rate throughout the reactor due to the increased local temperature variation.

For this reason, conventionally a mixer rotated by motor is installed in reactor to improve flowability of a reaction mixture. On the other hand, alternatively, a ratio of a solvent to a reaction mixture is increased to lower the viscosity of the reaction mixture, which results in increase in flowability of the reaction mixture.

The mixer-equipped reactor has a disadvantage of requiring an additional expensive motor for driving the mixer. Therefore, the mixer-equipped reactor is disadvantages in terms of high facility investment cost, and operation and maintenance cost attributable to the expensive motor. Meanwhile, the approach of increasing a solvent ratio has a disadvantage of a low polymer preparation yield although it has an effect of lowering the viscosity of a reaction mixture in a reactor.

Under this circumstance, the present invention proposes a novel reactor structure capable of preparing polymers having homogenous physical properties by improving flowability of a reaction mixture in a reactor without using a motor-driven mixer that is required in conventional solution polymerization process reactors.

Hereinafter, conventional arts in the field to which the present invention belongs will be briefly described first, and then technical merit of the present invention over the conventional arts will be described.

First, Korean Patent No. 0981612 discloses an internal circulation type fluidized bed polymerization reactor and a polymerization method for preparing polyolefin using the reactor. More specifically, the internal circulation type polymerization reactor includes: a draft tube installed in a reactor and provided with a through-hole; and a gas distributor obliquely extending from the exterior surface of the draft tube to the wall of the reactor. The internal circulation type fluidized bed polymerization reactor induces internal circulation of polyolefin particles to maximize a contact period during which circulation air and the polyolefin particles are in contact with each other, thereby increasing a polyolefin production rate.

Meanwhile, Korean Patent No. 1124187 discloses a Process and apparatus for ethylene polymerization. More specifically, the polyethylene preparation process includes: (a) polymerizing ethylene and one or more kinds of alpha-olefin comonomers having three to twelve carbon atoms under the presence of hydrogen in a gas phase reactor; and (b) copolymerizing ethylene with one or more kinds of alpha-olefin comonomers having three to twelve carbon atoms under the presence of a smaller amount of hydrogen than that in the step (a) in a different gas phase reactor, wherein in at least one of the gas phase reactors, growing polymer particles flow upward through a first polymerization region, i.e. up-flow region, under a fast flow or movement condition, then flow downward due to gravity while passing through a second polymerization region, i.e. down-flow region, and enter again into and pass through the up-flow region. That is, in the process, the polymer circulates in a manner of alternately passing through the two polymerization regions.

Meanwhile, Korean Patent Application Publication No. 2013-0121964 relates to a high throughput reactor assembly for polymerization of olefins. More specifically, it discloses a reactor assembly for preparation of polymers, the reactor assembly including: a fluidized bed reactor composed of a lower part provided with an aeration gas inlet, a middle part, and an upper part provided with an aeration gas outlet; and a gas-solid separation means connected to a gas circulation line and separating solids from gas. The aeration gas outlet is connected to the fluidized bed reactor via the gas circulation line and the aeration gas inlet. The upper part has an equivalent horizontal cross-section diameter that decreases gradually in a flow direction of an aeration gas passing through the fluidized bed reactor. The middle part has an equivalent horizontal cross-section diameter that is substantially uniform in the flow direction the aeration gas passing through the fluidized bed reactor. A ratio of the height of the fluidized bed reactor with respect to the equivalent horizontal cross-section diameter of the middle part of the fluidized bed reactor is 2:1 to 10:1, and the upper part is directly connected to the middle part.

Korean Patent No. 1415480 discloses a technology by which a polymerization solution circulated by a circulation cooling means and a base material are introduced into a protruded portion to address any non-uniformity problem attributable to external circulation used to control heat generation of a solution polymerization reaction.

These patent documents differ from the present Invention in that they do not disclose the present invention technology of improving reaction uniformity by maximizing mining of reactants, by means of internal circulation of the reactants caused by a guide pipe equipped with a helical screw blade and by means of an external loop, without using a mixer, in a solution polymerization process.

DISCLOSURE

Technical Problem

Accordingly, the present invention has been made in view of the problems occurring in the related art and an object of the present invention is to provide a reactor for a solution polymerization process using a metallocene catalyst for preparation of polyolefin polymers, the reactor including a cylinder-shaped guide pipe installed in a reaction vessel and equipped with a helical screw blade attached the exterior surface of the guide pipe, thereby causing internal circulation of a reaction mixture in the reaction vessel and consequently improving flowability of the reaction mixture in the reaction vessel without using a mixer, whereby the reactor can prepare polymers having homogeneous physical properties.

Another object of the present invention is to provide a reactor for a solution polymerization process for preparing polyolefin polymers, the reactor having the same structure for causing internal circulation as one described above and returning a fraction of the reaction mixture discharged from the reaction vessel, in a predetermined recycle ratio, to the reaction vessel, thereby improving flowability of the reaction mixture in the reaction vessel and minimizing a local temperature variation in the reaction vessel, whereby the reactor can prepare polymers having homogeneous physical properties.

A further object of the present invention is to provide a reactor for a solution polymerization process for preparing polyolefin polymers, the reactor further including a comonomer preparation unit that prepares a comonomer using ethylene or butane and supplies the prepared comonomer to the reaction vessel because a solution is required to contain several tens of percentages by weight of the comonomer to lower the density when preparing polymers through a solution polymerization process using a metallocene catalyst, whereby the reactor can improve a preparation efficiency of polymers by lowering cost for purchase of the comonomer.

Technical Solution

In order to accomplish the above object, the present invention provides a reactor for a solution polymerization process using a metallocene catalyst for preparing polyolefin polymers, the reactor including: a reaction vessel configured to mix a hydrocarbon-based solvent and an olefin monomer, thereby preparing polyolefin polymers; a feed inlet installed at a lower portion of the reaction vessel and feeding a feed including an unreacted monomer, a solvent, and a catalyst into the reaction vessel; a guide pipe having a cylinder shape being open at respective ends, installed in the reaction vessel along a central axis of the reaction vessel, and dividing an internal space of the reaction vessel into an up-flow region where a reaction mixture flows upward and a down-flow region where the reaction mixture flows downward; and a swirling flow-inducing blade having a helical screw blade shape and attached to an exterior surface of the guide pipe, the swirling flow-inducing blade causing the reaction mixture in the reaction vessel to rise along the exterior surface of the guide pipe while forming a swirling flow, then to enter into the guide pipe at an upper end portion of the reaction vessel, and finally to flow down through the guide pipe.

According to the aspect, the feed inlet may include a small mixer to disperse the catalyst in the feed.

According to the aspect, the reactor may further include an internal circulation guide plate disposed under the guide pipe and functioning as a guide for causing internal circulation of the reaction mixture in the reaction vessel such that the feed, introduced into the reaction vessel through the feed inlet, and a flow of the reaction mixture, flowing downward through the guide pipe, are guided to be directed away from the guide pipe.

According to the aspect, the reactor may further include: an outlet that is provided to the reaction vessel so that the reaction mixture is discharged outside the reaction vessel; and an external loop through which a predetermined fraction of the reaction mixture discharged from the reaction vessel is returned, in a predetermined recycle ratio, to the reaction vessel through the feed inlet.

According to the aspect, the reactor may further include a circulation pump that pumps the reaction mixture discharged through the outlet to the feed inlet.

According to the aspect, the reactor may further include a cooler or heat exchanger configured to remove reaction heat generated through a reaction of the reaction mixture circulating through the external loop.

According to the aspect, the recycle ratio may be adjusted in accordance with a viscosity of the reaction mixture in the reaction vessel.

According to the aspect, the recycle ratio that is a ratio of an amount of the feed introduced into the reaction vessel and an amount of the reaction mixture returned to the reaction vessel through the external loop may be within a range of from 1:0.1 to 1:3, and preferably within a range of from 1:0.1 to 1:2, and more preferably within a range of from 1:0.1 to 1:1, and most preferably within a range of 1:0.3 to 1:0.8.

According to the aspect, the reaction vessel includes at least two or more reaction vessels connected in parallel, in series, or in a series-parallel mixed manner.

According to the aspect, the reactor may further include a comonomer preparation unit preparing a comonomer, necessarily used in the solution polymerization process, using ethylene or butane, and then supplying the comonomer to the reaction vessel.

Advantageous Effects

The present invention relates to a reactor for a metallocene catalyst-based solution polymerization process for preparing polyolefin polymers. The reactor prepares polymers with homogeneous physical properties by improving flowability of a highly viscous polymer solution contained in the reactor. In addition, the reactor has an effect of increasing polymer preparation productivity by adding an external loop that improves heat removal performance which cannot be sufficiently accomplished only with the use of a jacket of a highly viscous polymer preparation reactor. Particularly, the reactor minimizes a local temperature variation in an internal space thereof by improving flowability in the internal space. Thus, the reactor has an effect of preparing polymers having homogeneous physical properties by minimizing a variation in polymerization rate depending on temperature.

DESCRIPTION OF DRAWINGS

FIG. 1 is a schematic diagram illustrating an internal structure of a reactor for a metallocene catalyst-based solution polymerization process for preparing polyolefin polymers according to one embodiment of the present invention; and FIG. 2 is a block diagram illustrating an external loop of the reactor for metallocene catalyst-based solution polymerization process for preparing polyolefin polymers according to one embodiment of the present invention.

BEST MODE

Hereinafter, reactors for a metallocene catalyst-based solution polymerization process for preparing polyolefin polymers according to preferred embodiments of the present invention will be described in detail below with reference to the accompanying drawings such that an ordinarily skilled person in the art can easily utilize the present invention.

In the drawings, the sizes and dimensions of components may be exaggerated for clarity, and well-known elements may not be illustrated so that features of the present invention can be stood out. Therefore, the construction of the present invention is not limited to the drawings.

In describing principles of preferred embodiments of the present invention, detailed descriptions of known functions and components incorporated herein will be omitted when it may make the subject matter of the present invention unclear.

The embodiments described in the present specification and the configurations shown in the drawings are provided as merely the most preferred embodiments of the present invention, but are not provided as the entirety of technical ideas of the present invention. Therefore, it should be understood that equivalents and modifications are possible.

An embodiment of the present invention relates to a reactor for a solution polymerization process using a metallocene catalyst for preparing polyolefin polymers. The reactor of the present invention can produce polymers having homogeneous physical properties by improving a medium's flowability in a reactor filled with a highly viscous polymer solution. In addition, the reactor has high heat removal performance, which is difficult to be obtained only with the use of a jacket of a reactor filled with a highly viscous medium, by using an external loop, thereby having an effect of improving polymer preparation productivity. In addition, the reactor minimizes a local temperature variation within reaction vessel by improving medium's flowability, thereby minimizing a variation in reaction rate depending on temperature and resulting in polymers having homogeneous physical properties.

Hereinafter, with reference to FIGS. 1 and 2, the structure and operation of a reactor for a metallocene catalyst-based solution polymerization process for preparing polyolefin polymers, according to one embodiment of the present invention, are described in detail.

First, FIG. 1 a schematic view illustrating the internal structure of the reactor for a metallocene catalyst-based solution polymerization process for preparing polyolefin polymers, according to one embodiment of the present invention.

As illustrated in FIG. 1, with respect to the reactor for a metallocene catalyst-based solution polymerization process for preparing polyolefin according to one embodiment of the present invention, the reactor includes a reaction vessel 100, a guide pipe 110, an internal circulation guide plate 120, a feed inlet 130, and an outlet 140.

Specifically, the reaction vessel 100 refers to a housing in which a hydrocarbon-based solvent and an olefin monomer are mixed and polymerized to produce polyolefin. A lower end portion of the reaction vessel 100 is provided with the feed inlet 130 through which a feed including a monomer as a base material, a solvent, and a catalyst is introduced into the reaction vessel 100.

A small mixer may be installed in the feed inlet 130 to uniformly blend the catalyst with a promoter included in the feed.

The guide pipe 110 guides the feed introduced into the reaction vessel 100 through the feed inlet 130 and a reaction mixture that is under reaction in the reaction vessel 100 such that the feed and the reaction mixture circulate in the reaction vessel 100. The guide plate 110 is installed to extend along a central axis of the reaction vessel 100.

More specifically, the guide pipe 110 has a cylinder shape that is open at an upper end and a lower end. The guide pipe 110 installed in the reaction vessel 100 to extend along the central axis of the reaction vessel 100, thereby dividing an internal space of the reaction vessel 100 into an up-flow region where the reaction mixture flows upward and a down-flow region where the reaction mixture flows downward. In the reaction vessel, the outside of the guide pipe 110 serves as the up-flow region and the inside of the guide pipe 110 serves as the down-flow region.

A swirling flow-inducing blade 111 in the form of a helical screw blade is attached to the exterior surface of the guide pipe 110. Due to the swirling flow-inducing blade 111, the reaction mixture rising along the exterior surface of the guide pipe 110 forms a swirling flow.

Due to the structure of the guide pipe 110, the reaction mixture in the reaction vessel 100 first swirlingly flows upward along the exterior surface of the guide pipe 110, then enters into the upper end opening of the guide pipe 110 at an upper end portion of the reaction vessel 100, and finally flows down through the guide pipe 110. That is, since the reaction mixture flows in a swirling manner, flowability of the reaction mixture is improved and thus a reaction rate becomes uniform throughout the entire region of the reaction vessel. Furthermore, a location temperature variation in the reaction vessel 100 is also reduced due to the improved flowability.

In addition, the reactor for a solution polymerization process for preparing polymers, according to the present invention, is provided with the internal circulation guide plate 120 between the feed inlet 130 and the guide pipe 110. The internal circulation guide plate 120 is provided to address problem that the feed introduced into the reaction vessel 100 through the feed inlet 130 hinders internal circulation in the reaction vessel 100 when the feed is directly introduced into the guide pipe 110.

The internal circulation guide plate 120 prevents the feed, introduced into the reaction vessel 100 through the feed inlet 130, from moving toward the guide pipe 110 and (guides the flow of the feed along a path that is directed away from the guide pipe 110. Besides, the internal circulation guide plate 120 causes the reaction mixture, flowing down through the guide pipe 110, to move away from the guide pipe 110 so as to be well-circulated in the reaction vessel 100.

As described above, the reactor for a metallocene catalyst-based solution polymerization process for preparing polyolefin polymers, according to the present invention, circulates the reaction mixture with the use of the guide pipe 110 such that the reaction mixture rises up to an upper end portion of the reaction vessel 100 while forming a swirling up-flow in a region outside the guide pipe 110 and then falls through the guide pipe 110. Therefore, the reactor according to the present invention improves flowability in the reaction vessel 100 without using an additional mixer. For this reason, it is possible to reduce investment cost for facilities or equipment such as an expensive motor for a mixer and also to reduce operation and maintenance cost.

FIG. 2 is a block diagram illustrating an external loop of the reactor for a metallocene catalyst-based solution polymerization process for preparing polyolefin polymers, according to one embodiment of the present invention.

As illustrated in FIG. 2, the reactor for a metallocene catalyst-based solution polymerization process for preparing polyolefin polyers, according to one embodiment of the present invention, has an effect of further improving flowability in the reaction vessel and consequently reducing a local temperature variation by using the external loop.

More specifically, the reactor the present invention has the external loop through which a predetermined fraction of the reaction mixture discharged from the outlet 140 of the reaction vessel 100 is returned, in a predetermined recycle ratio, to the reaction vessel 100 through the feed inlet 130.

The recycle ratio refers to a ratio of the amount of the feed introduced into the reaction vessel 100 and the amount of the reaction mixture returned to the reaction vessel 100 through the external loop. The external loop in the present invention is designed such that the recycle ratio is about 1:0.1 to 1:3. The recycle ratio may be preferably 1:0.1 to 1:2, and more preferably 1:0.1 to 1:1, and most preferably 1:0.3 to 1:0.8. When the recycle ratio is lower than 1:0.1, a mixing effect of the reaction mixture obtained by the external loop is insufficient. Conversely, when the recycle ratio is beyond 1:3, energy consumption for the circulation of the reaction mixture through the external loop is excessively large. Therefore, the reactor is preferably operated at a recycle ratio within the above-mentioned range.

As described, the reactor of the present invention primarily improves the flowability of the reaction mixture through the internal circulation induced by the guide plate and further improves the flowability through the external loop by adjusting the recycle ratio. For reference, as to the recycle ratio, as a ratio of the reaction mixture returned to the reaction vessel through the external loop is increased, the velocity of a solution is increased and thus the flowability of a solution is accordingly improved.

Specifically, since the recycle ratio is determined in accordance with the viscosity of the reaction mixture, it is possible to minimize a local temperature variation in the reactor by adjusting the flowability of the reaction mixture.

Conventionally a method of lowering a polymer-to-solvent ratio is used to produce a highly viscous polymer. Therefore, productivity of polymer preparation was low. However, the reactor of the present invention adopts a method of minimizing a local temperature variation in the reaction vessel 100 by improving the flowability of the reaction mixture in the reaction vessel 1000. Therefore, the reactor of the present invention can produce polymers having homogeneous physical properties while maintaining high productivity.

The external loop further includes a circulation pump 140 that pumps the reaction mixture, discharged through the outlet 140, to the feed inlet 130.

In addition, the external loop may further include a cooler or a heat exchanger 300, such as a shell and tube and a single jacket tube, to remove reaction heat caused by a reaction of the reaction mixture. The external loop minimizes exhaust of non-reacted residual gas, thereby improving operation stability and productivity.

On the other hand, the reactor the present invention may include two more reaction vessels 100 connected with each other in parallel, in series, or in a mixed (series-parallel) manner. In this case, it is possible to increase the productivity of polymer preparation and to control the physical properties and molecular weights of the produced polymers.

Typically, when preparing a polymer through a solution process using a metallocene catalyst, a reaction mixture contains several tens of percentages by weight of a comonomer for reduction of the density. Examples of the comonomer include butane, hexane, octane, and others having a larger molecular weight than these.

As described above, since a solution polymerization process using a metallocene catalyst requires a large amount of a comonomer and since the price of a comonomer fluctuates according to the supply of a comonomer and economic and fluctuations, it is difficult to secure production profitability.

To solve this problem, the reactor of the present invention includes a comonomer preparation unit 400 that prepares a comonomer, for use in a solution polymerization process, using ethylene or butane. The comonomer preparation unit 400 is provided at a previous stage of the reaction vessel 100 and supplies the prepared comonomer to the reaction vessel 100. Since the reactor of the present invention prepares a comonomer on site by using ethylene or butane that is relatively inexpensive and more stable in price, and directly supplies the prepared comonomer to the reaction vessel 100, it is possible to secure stable production profitability.

In addition, since this method enables supply of a comonomer to polymerization process without requiring transportation, storage facilities, and refining facilities associated with the usage of a comonomer, it is possible to produce a polymer mixture at relatively low cost without being worried about the demand-supply status of a comonomer.

Although a preferred embodiment of the present invention has been described for illustrative purposes, those skilled in the art will appreciate that various modifications and equivalents thereof are possible, without departing from the scope and spirit of the invention. Accordingly, the technical protection scope of the present invention should be defined only by the accompanying claims.

DESCRIPTION OF THE REFERENCE NUMERALS IN THE DRAWINGS

100: Reaction vessel
110: Guide pipe
111: Swirling flow-inducing blade
120: Internal circulation guide plate
130: Feed inlet
140: Outlet

200: Circulation pump
300: Cooler or heat exchanger
400: Comonomer preparation unit

The invention claimed is:

1. A reactor for a solution polymerization process using a metallocene catalyst for preparing polyolefin polymers, the reactor comprising:
   a reaction vessel configured to mix a hydrocarbon-based solvent and an olefin monomer, thereby preparing polyolefin polymers;
   a feed inlet installed at a lower portion of the reaction vessel and feeding a feed including an unreacted monomer, a solvent, and a catalyst into the reaction vessel;
   a guide pipe having a cylinder shape being open at respective ends, installed in the reaction vessel along a central axis of the reaction vessel, and dividing an internal space of the reaction vessel into an up-flow region where a reaction mixture flows upward and a down-flow region where the reaction mixture flows downward;
   a swirling flow-inducing blade having a helical screw blade shape and attached to an exterior surface of the glide pipe, the swirling flow-inducing blade causing the reaction mixture in the reaction vessel to rise along the exterior surface of the guide pipe while forming a swirling flow, then to enter into the guide pipe at an upper end portion of the reaction vessel, and finally to flow down through the guide pipe;
   an outlet that is provided to the reaction vessel so that the reaction mixture is discharged outside the reaction vessel; and
   an external loop through which a predetermined fraction of the reaction mixture discharged from the reaction vessel is returned, in a predetermined recycle ratio, to the reaction vessel through the feed inlet,
   wherein the recycle ratio that is a ratio of an amount of the feed introduced into the reaction vessel and an amount of the reaction mixture returned to the reaction vessel through the external loop is in a range of from 1:0.1 to 1:3.

2. The reactor according to claim 1, further comprising:
   an internal circulation guide plate disposed under the guide pipe and functioning as a guide for causing internal circulation of the reaction mixture in the reaction vessel such that the feed, introduced into the reaction vessel through the feed inlet, and a flow of the reaction mixture, flowing downward through the guide pipe, are guided to be directed away from the guide pipe.

3. The reactor according to claim 1, further comprising:
   a cooler or heat exchanger configured to remove reaction heat generated through a reaction of the reaction mixture circulating through the external loop.

4. The reactor according to claim 1, wherein the recycle ratio is adjusted in accordance with a viscosity of the reaction mixture in the reaction vessel.

5. The reactor according to claim 1, wherein the reaction vessel comprises at least two reaction vessels connected in parallel, in series, or in a series-parallel mixed manner.

6. The reactor according to claim 1, further comprising:
   a comonomer preparation unit preparing a comonomer, necessarily used in the solution polymerization process, using ethylene or butane, and then supplying the comonomer to the reaction vessel.

\* \* \* \* \*